(12) United States Patent
Lu et al.

(10) Patent No.: US 8,539,607 B2
(45) Date of Patent: Sep. 17, 2013

(54) METHOD FOR VALIDATING USER EQUIPMENT, A DEVICE IDENTITY REGISTER AND AN ACCESS CONTROL SYSTEM

(75) Inventors: Jie Lu, Guangdong (CN); Lin Zhaoji, Guangdong (CN); Hu Jie, Guangdong (CN)

(73) Assignee: ZTE Corporation, Shenzhen (CN)

( * ) Notice: Subject to any disclaimer, the term of this patent is extended or adjusted under 35 U.S.C. 154(b) by 283 days.

(21) Appl. No.: 12/991,579

(22) PCT Filed: Sep. 24, 2008

(86) PCT No.: PCT/CN2008/072490
§ 371 (c)(1),
(2), (4) Date: Nov. 8, 2010

(87) PCT Pub. No.: WO2009/135367
PCT Pub. Date: Nov. 12, 2009

(65) Prior Publication Data
US 2011/0067116 A1    Mar. 17, 2011

(30) Foreign Application Priority Data
May 9, 2008 (CN) .......................... 2008 1 0099503

(51) Int. Cl.
*G06F 7/04* (2006.01)
(52) U.S. Cl.
USPC .......................................................... 726/29
(58) Field of Classification Search
USPC .......................................................... 726/29
See application file for complete search history.

(56) References Cited

U.S. PATENT DOCUMENTS

| 7,359,352 B2 | 4/2008 | Kim et al. |
| 2004/0162066 A1* | 8/2004 | Kuchibhotla et al. .......... 455/423 |
| 2005/0122905 A1 | 6/2005 | Jung |
| 2005/0186939 A1* | 8/2005 | Barnea et al. ................. 455/405 |
| 2006/0171536 A1 | 8/2006 | Lim |
| 2009/0172798 A1* | 7/2009 | Upp .............................. 726/10 |

FOREIGN PATENT DOCUMENTS

| CN | 1543259 A | 11/2004 |
| CN | 1816216 A | 8/2006 |
| CN | 101106508 A | 1/2008 |

* cited by examiner

*Primary Examiner* — Jacob Lipman
(74) *Attorney, Agent, or Firm* — Christopher L. Parmelee; Walker & Jocke (57) ABSTRACT

The present invention discloses a method for validating user equipment, a device identity register and an access control system. Wherein the method for validating user equipment comprises: setting a central device identity register shared by different networks, wherein illegal user equipment identities are stored in the central device identity register; the central device identity register receiving an ID validation request from a mobility management entity, wherein the ID validation request carries ID parameters of a user equipment; the central device identity register validating the validity of the user equipment according to the ID parameters, and returning a validation result to the mobility management entity. In virtue of the present invention, the accessing of the illegal non-3GPP network user equipment which is capable of accessing 3GPP network to the 3GPP network is able to be controlled.

20 Claims, 6 Drawing Sheets

METHOD FOR VALIDATING USER EQUIPMENT, A DEVICE IDENTITY REGISTER AND AN ACCESS CONTROL SYSTEM

FIELD OF THE INVENTION

The present invention relates to the communication field, in particular to a method for validating user equipment, a device identity register and an access control system.

BACKGROUND OF THE INVENTION

Along with the development of network technology, terminals integrated with access functions of various kinds of networks are increased, and the user hopes that the network not only can manage contracted users, but also can effectively manage terminal devices. Thus, the benefits of legal terminal users and legal terminal manufacturers can be effectively ensured.

For instance, with the fast development of 3GPP (3rd Generation Partnership Project) LTE/SAE (Long Term Evolution/Service Architecture Evolution), many non-3GPP terminals can be integrated with 3GPP LTE access function. The current 3GPP network generally can identify the terminal ID (Identity) in the local network domain, and perform management to the terminal access. However, in case of other network types, for instance 3GPP2, WiMAX (Worldwide Interoperability for Microwave Access), WLAN (Virtual Local Area Network) and the like, if terminals which have the 3GPP LTE network access functions attempt to access the 3GPP network, the 3GPP network will not be able to identify the terminal ID, thus the management of the 3GPP network to the terminal will become difficult or helpless.

One possible scene is that when using an illegal laptop (stolen laptop) which supports the 3GPP LTE access to access the service provided by the 3GPP LTE/SAE, due to the laptop is a non-3GPP terminal, the current 3GPP network can not analyze the MAC (Medium Access Control) address of the laptop, thus the current 3GPP network will not perform any terminal ID validation to the laptop terminal and will directly allow the laptop to use the service provided by the 3GPP network.

Another possible scene is that when a stolen and cloned multimode non-3GPP terminal which supports the 3GPP network is used, if the terminal attempts to access the service provided by the 3GPP network, the 3GPP network will not be able to identify the device identity of the terminal, and has to imply that the terminal is allowed to access the network.

The above two scenes are both against the principle that the telecommunication network terminal should be able to be managed, and will probably lead the benefits of legal terminal manufacturers and legal terminal users to be invaded. Therefore, to provide a technical scheme to ensure that the provider of some network can safely and effectively manage the terminals of various network types is significant.

In the implementation of the present invention, the inventor finds that the prior art at least has the following problems: the 3GPP network can not identify the terminal ID of non-local network, and will not validate the access request of the terminal of non-local network, and implies to provide services for the terminal.

SUMMERY OF THE PRESENT INVENTION

The present invention aims at providing a method for validating user equipment, an access control system and a device identity register to solve the problem that the 3GPP network can not identify the non-3 GPP terminal in the prior art.

According to one aspect of the present invention, a method for validating user equipment is provided.

The method for validating user equipment according to the present invention comprises: setting a central device identity register shared by different networks, wherein illegal user equipment identities are stored in the central device identity register; the central device identity register receiving an ID validation request from a mobility management entity, wherein the ID validation request carries ID parameters of a user equipment; the central device identity register validating the validity of the user equipment according to the ID parameters, and returning a validation result to the mobility management entity.

Preferably, the process that the central device identity register validates the validity of the user equipment corresponding to the ID parameters carried in the ID validation request concretely is: the central device identity register abstracting the ID parameters carried in the ID validation request; the central device identity register matching the abstracted ID parameters with the illegal user equipment identities stored in the central device identity register, if the matching is successful, the user equipment corresponding to the ID parameters is illegal; if the matching is unsuccessful, the user equipment corresponding to the ID parameters is legal.

Preferably, the mobility management entity controlling the access of the user equipment to the 3GPP network according to the validation result, wherein if the validation result is legal, the user equipment will be allowed to access the 3GPP network; otherwise, the user equipment will be prohibited to access the 3GPP network.

Preferably, before the central device identity register receiving an ID validation request from a mobility management entity and/or after the central device identity register validating the validity of the user equipment according to the ID parameters, the method also comprises: the mobility management entity sending an ID request to the user equipment which requests to access the 3GPP network; the mobility management entity receiving an ID response returned by the user equipment, wherein the ID response comprises the ID parameters of the user equipment.

Preferably, the different networks comprise: 3GPP, 3GPP2, WiMAX and WLAN.

Preferably, the illegal user equipment identities stored in the central device identity register comprise illegal non-3GPP network user equipment identities and illegal 3GPP network user equipment identities.

Wherein, the ID parameters of the user equipment comprise at least one of the following parameters or the combination thereof: international mobile subscriber identity, international mobile equipment identity, MAC address and mobile equipment identity.

According to another aspect of the present invention, a device identity register is also provided.

The device identity register according to the present invention comprises: a storing module, configured to store illegal user equipment identities of different networks; a receiving module, configured to receive an ID validation request from the network side, wherein the ID validation request carries ID parameters of a user equipment; a validating module, configured to validate the validity of the user equipment according to the illegal user equipment identities and the ID parameters, and to return a validation result to the network side.

Preferably, the illegal user equipment identities comprise illegal non-3GPP network user equipment identities and/or illegal 3GPP network user equipment identities.

Preferably, the validating module further comprises: an abstracting module, configured to abstract the ID parameters carried in the ID validation request; a matching module, configured to match the ID parameters with the illegal user equipment identities; a determining module, configured to determine the validity of the user equipment corresponding to the ID parameters according to the matching result of the matching module; a feedback module, configured to return the validation result to the network side.

Preferably, if the matching of the matching module is successful, the determining module determines the user equipment corresponding to the ID parameters as illegal; if the matching of the matching module is unsuccessful, the determining module determines the user equipment corresponding to the ID parameters as legal.

According to another aspect of the present invention, an access control system is also provided.

The access control system according to the present invention comprises: a central device identity register, configured to store illegal user equipment identities of a plurality of networks, to receive an ID validation request, wherein the ID validation request carries ID parameters of a user equipment, to validate the validity of the user equipment according to the illegal user equipment identities and the ID parameters, and to return a validation result; a mobility management entity, configured to receive the validation result, and to control the access of the user equipment to the 3GPP network.

Preferably, the central device identity register comprises: a storing module, configured to store the illegal user equipment identities of different networks, wherein the illegal user equipment identities comprise illegal non-3GPP network user equipment identities and/or illegal 3GPP network user equipment identities; a receiving module, configured to receive the ID validation request from the network side, wherein the ID validation request carries the ID parameters of the user equipment; a validating module, configured to validate the validity of the user equipment according to the illegal user equipment identities and the ID parameters, and to return the validation result to the network side.

Preferably, the validating module further comprises: an abstracting module, configured to abstract the ID parameters carried in the ID validation request; a matching module, configured to match the ID parameters with the illegal user equipment identities; a determining module, configured to determine the validity of the user equipment corresponding to the ID parameters according to the matching result of the matching module; a feedback module, configured to return the validation result to the network side.

Preferably, the mobility management entity concretely comprises: an access controlling module, configured to allow the access of the user equipment to the 3GPP network if the validation result is legal, and to prohibit the access of the user equipment to the 3GPP network if the validation result is illegal; an ID receiving-sending module, configured to send a request message to the user equipment which requests to access the 3GPP network to obtain the ID parameters of the user equipment, and to receive an ID response returned by the user equipment, wherein the ID response comprises the ID parameters of the user equipment.

According to another aspect of the present invention, method for validating user equipment is also provided.

The method for validating user equipment according to the present invention comprises: step S1, after a user equipment accesses a network, a device on the network side sending a request message to the user equipment in order to obtain ID parameters of the user equipment; step S2, the user equipment receiving the request message, and sending a response message to the device on the network side, wherein the response message comprises the ID parameters of the user equipment; step S3, the device on the network side sending an ID validation request message of the user equipment to a device identity memorizer, wherein the validation request message comprises the ID parameters of the user equipment; step S4, the device identity memorizer receiving the ID validation request from the device on the network side, validating the validity of the user equipment according to the ID parameters and returning a validation result to the device on the network side.

Preferably, after the device identity memorizer returning the validation result to the device on the network side in step S4, the method also comprises: step S5, the device on the network side sending a request message to the user equipment which requests to access the network/ is accessing the network to obtain the ID parameters of the user equipment; the device on the network side receiving an ID response returned by the user equipment, wherein the ID response comprises the ID parameters of the user equipment.

Preferably, after step S5, the method further comprises: implementing step S3 and step S4.

Preferably, the device on the network side is a mobility management entity, in the circumstance that the mobility management entity receives the validation result after executing step S5, the mobility management entity control the access of the user equipment to a 3GPP network according to the validation result.

Preferably, the mobility management entity controlling the access of the user equipment to a 3GPP network according to the validation result comprises: if the validation result is legal, the mobility management entity allowing the access of the user equipment to the 3GPP network; if the validation result is illegal, the mobility management entity prohibiting the access of the user equipment to the 3GPP network.

Preferably, the network is the 3GPP network, and the user equipment comprises the non-3GPP network user equipment which supports the 3GPP access function.

Preferably, the device identity memorizer is configured to store illegal user equipment identities which comprise the illegal non-3GPP network user equipment identities and illegal 3GPP network user equipment identities, step S4 further comprises: the device identity memorizer judging whether the ID parameters are the same as the illegal user equipment identities stored in the device identity memorizer, if they are the same, a validation result that the user equipment is legal will be fed back to the device on the network side, which is used for the device on the network side to allow the service request of the user equipment; otherwise, a validation result that the user equipment is illegal will be fed back to the device on the network side, which is used for the device on the network side to prohibit the service request of the user equipment.

Preferably, the ID parameters of the user equipment comprise at least one of the following parameters or the combination thereof: international mobile subscriber identity, international mobile equipment identity, MAC address and mobile equipment identity.

Preferably, the device on the network side comprises a mobility management entity, and the device identity memorizer is a central device identity register which is used for sharing the illegal user equipment identities in 3GPP network and non-3GPP network.

Preferably, the non-3GPP network at least comprises: 3GPP2, WiMAX and WLAN.

According to another aspect of the present invention, a method for validating user equipment is also provided.

The method for validating user equipment according to the present invention comprises: step S1, after a non-3GPP network user equipment which has a 3GPP network access function accesses the 3GPP network, a device on the network side sending a request message for obtaining a unique identity parameter of the non-3GPP network user equipment to the non-3GPP network user equipment; step S2, after receiving the request message, the non-3GPP network user equipment feeding back the unique identity parameter of the non-3GPP network user equipment to the device on the network side; step S3, the device on the network side sending a unique identity parameter validation request message of the non-3GPP network user equipment to a storing unit which stores unique identity parameters of illegal non-3GPP network user equipments, wherein the validation request message comprises the unique identity parameter of the non-3GPP network user equipment; step S4, the storing unit receiving the unique identity parameter validation request message of the non-3GPP network user equipment from the device on the network side, and validating the validity of the non-3GPP network user equipment according to the stored unique identity parameters of the illegal non-3GPP network equipments.

Preferably, in step S1, the device on the network side sends the request message for obtaining the unique identity parameter of the non-3GPP network user equipment to the non-3GPP network user equipment regularly.

According to another aspect of the present invention, a system for validating user equipment is also provided.

The system for validating user equipment comprises: a device on the network side, configured to send a request message to a user equipment in order to obtain ID parameters of the user equipment after the user equipment accesses a network; the user equipment, configured to receive the request message, and to send a response message to the device on the network side, wherein the response message comprises the ID parameters of the user equipment; the device on the network side, further configured to send an ID validation request message of the user equipment to a device identity memorizer, wherein the validation request message comprises the ID parameters of the user equipment; the device identity memorizer, configured to receive the ID validation request from the device on the network side, to validate the validity of the user equipment according to the ID parameters and to return a validation result to the device on the network side.

Preferably, the device on the network side is also configured to send a request message to the user equipment which requests to access the network/ is accessing the network to obtain the ID parameters of the user equipment, and to receive an ID response returned by the user equipment, wherein the ID response comprises the ID parameters of the user equipment.

Preferably, the device on the network side is also configured to send an ID validation request message of the user equipment which requests to access the network/is accessing the network to a device identity memorizer, wherein the validation request message comprises the ID parameters of the user equipment which requests to access the network/ is accessing the network; the device identity memorizer is also configured to receive the ID validation request from the device on the network side, to validate the validity of the user equipment which requests to access the network/ is accessing the network according to the ID parameters and to return a validation result to the device on the network side.

Preferably, the device on that network side is a mobility management entity, the device on the network side is also configured to control the access of the user equipment to a 3GPP network according to the validation result.

Preferably, the device on the network side is configured to allow the access of the user equipment to the 3GPP network if the validation result is legal; and to prohibit the access of the user equipment to the 3GPP network if the validation result is illegal.

Preferably, the network is the 3GPP network, and the user equipment comprises the non-3GPP network user equipment which supports the 3GPP access function.

Preferably, the device identity memorizer is configured to store illegal user equipment identities which comprise the illegal non-3GPP network user equipment identities and illegal 3GPP network user equipment identities, the device identity memorizer is configured to judge whether the ID parameters are the same as the illegal user equipment identities stored in the device identity memorizer, if they are the same, a validation result that the user equipment is legal will be fed back to the device on the network side, which is used for the device on the network side to allow the service request of the user equipment; otherwise, a validation result that the user equipment is illegal will be fed back to the device on the network side, which is used for the device on the network side to prohibit the service request of the user equipment.

Preferably, the device on the network side comprises a mobility management entity, and the device identity memorizer is a central device identity register which is used for sharing the illegal user equipment identities in 3GPP network and non-3GPP network.

In virtue of the technical scheme of the present invention, the list of illegal users will be shared on a plurality of networks, the access control management can be effectively performed to the terminal devices of different network types which have accessed the 3GPP network, and the illegal non-3GPP network user equipment which is capable of accessing 3GPP network can be prohibited from accessing the 3GPP network.

BRIEF DESCRIPTION OF THE DRAWINGS

The drawings illustrated here provide a further understanding of the present invention and form a part of the present application. The exemplary embodiments and the description thereof are used to explain the present invention without unduly limiting the scope of the present invention, wherein.

DETAILED DESCRIPTION

General Description of Functions

The main ideas of the present invention are: a central device identity register (CDIR) which can be shared in different network domains (such as 3GPP, 3GPP2, WiMAX, WLAN and the like) is arranged, wherein the CDIR stores the identities (ID) of illegal devices; the 3GPP network validates the validity of the user equipment (UE) which accesses the 3GPP network according to the IDs of the illegal devices stored in the CDIR, and prevents the illegal UE from accessing the 3GPP network.

A detailed description is given to the preferred embodiments of the invention with reference to the accompanying drawings. The preferred embodiment of the present invention is described for the purpose of illustration, not for limiting the present invention.

Figure 1:
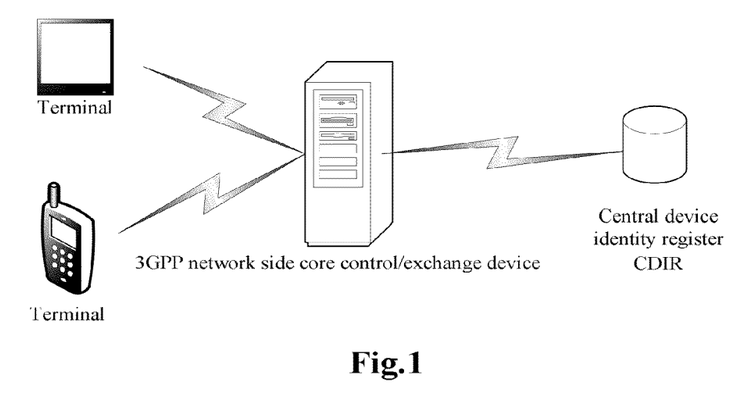
FIG. 1 is a schematic diagram of a network entity according to an embodiment of the present invention.

FIG. 1 shows a network entity which is used for realizing the embodiment according to the present invention. As shown in FIG. 1, the network entity mainly comprises: UEs which comprises 3GPP terminals and non-3GPP terminals, and a 3GPP network side core control/exchange device which mainly comprises a mobility management entity (MME) and a CDIR.

The terminal (UE) entities of the present invention particularly means multi-mode terminals which can access two or more than two communication networks, such as multi-mode mobile phone terminal, personal computer (PC) terminal which supports LTE function and the like. The MME in the present invention is mainly used to request/receive the ID information of the terminal entity, to request the CDIR to perform inspection for the ID of the terminal entity, and to control whether the terminal entity can access the 3GPP network or not according to the inspection result. The CDIR is used to store unique identities of the terminal entities in different network domains, and at the same time can be capable of handling the terminal ID inspection request sent by the MME.

Method Embodiment

A method for validating user equipment is provided according to an embodiment of the present invention.

After a UE accesses the 3GPP network, the 3GPP network starts the request process of the UE ID, and asks the terminal to report the ID parameters to the 3GPP network; in addition, after the UE accesses the 3GPP network, the network side also can initiate the inquiry of the UE ID periodically or according to preset strategy, starts the request process of the UE ID, and asks the terminal to report the ID parameters to the 3GPP network.

Wherein the ID parameters of the UE include but not limited to the module identities of contract customers and the ID of the UE. For a 3GPP terminal, the ID parameters can be international mobile subscriber identity (IMSI), international mobile equipment identity (IMEI) and the like; for a non-3GPP terminal which supports LTE/SAE capability, the ID parameters can be IMSI and MAC address or mobile equipment identity (MEID).

Based on the above contents, the MME sends an ID request to the UE which requests to access the 3GPP network; the MME receives an ID response returned by the UE, wherein the ID response comprises the ID parameters of the UE.

Figure 2:
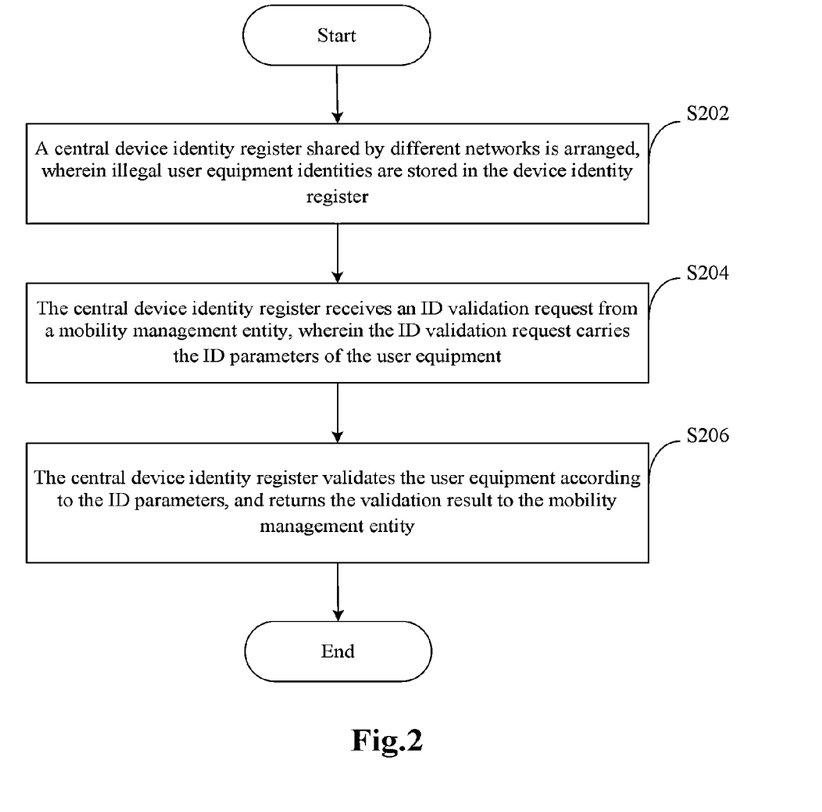
FIG. 2 is a flowchart of a method for validating user equipment according to an embodiment of the present invention.

And then, the following procedures as shown in FIG. 2 can be performed:

Step S202, a CDIR which can be shared by different networks is arranged, wherein the CDIR stores illegal UE identities (blacklist); the above-mentioned plurality of networks with different systems include but not limited to 3GPP, 3GPP2, WiMAX, WLAN and the like;

Step S204, the CDIR receives an ID validation request from the MME, wherein the ID validation request carries the ID parameters of the UE;

Step S206, the CDIR validates the validity of the UE according to the ID parameters, and returns a validation result to the MME.

In step S206, the process that the CDIR validates the validity of the user equipment corresponding to the ID parameters carried in the ID validation request concretely is: the CDIR abstracts the ID parameters carried in the ID validation request, and matches the abstracted ID parameters with the illegal UE identities stored in the CDIR, if the matching is successful, the UE corresponding to the ID parameters is illegal; if the matching is unsuccessful, the UE corresponding to the ID parameters is legal.

Then, the MME can control the UE to access the 3GPP network according to the validation result, wherein if the validation request is legal, the UE is allowed to access the 3GPP network; otherwise the UE is prohibited to access the 3GPP network.

Wherein, the illegal UE identities stored in the CDIR comprise illegal non-3GPP network UE identities and illegal 3-GPP network UE identities.

In virtue of the preferable embodiment, the 3GPP network is required to compulsively validate the UE of the non-3GPP network during the ID validation process of the UE, inspects whether the UE is in the blacklist of the illegal UE, and returns the inspection result to determine whether the requested service is provided for the UE of the non-3GPP network.

Figure 3:
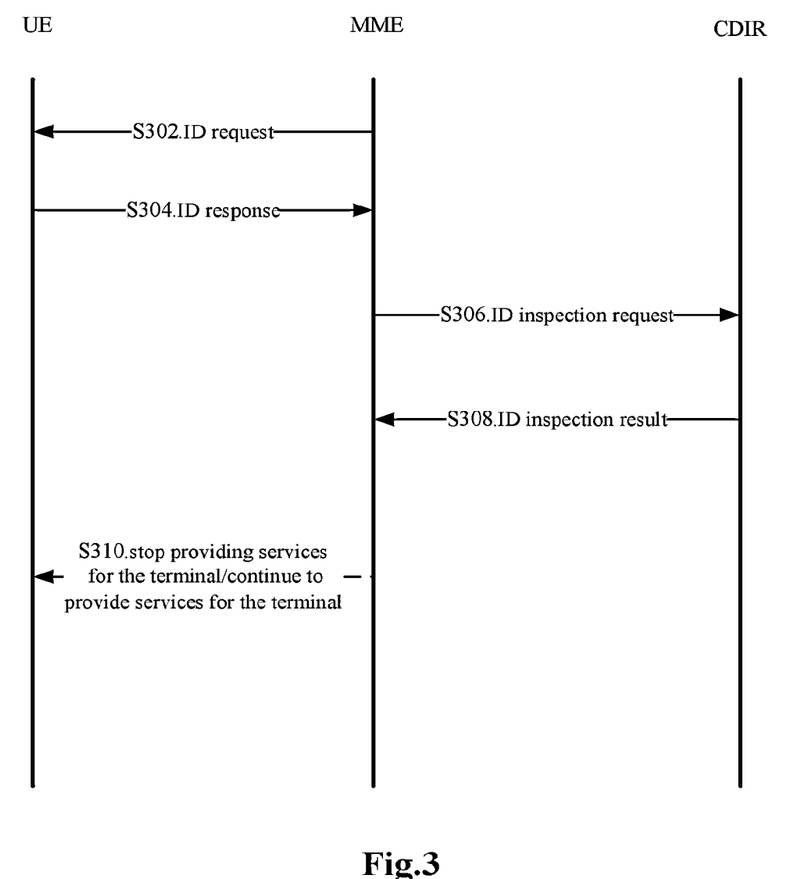
FIG. 3 is a schematic diagram of message interaction process according to an embodiment of the present invention.

FIG. 3 shows a detailed process of a method for validating user equipment according to an embodiment of the present invention. As shown in FIG. 3, message interactive procedures are as follows:

Step S302, a UE requests to access the 3GPP network, and the 3GPP network sends an "ID request" message to the UE via the MME on the network side to initiate a terminal identification process. In the ID type information unit of the message, the "ID request" message can appoint the ID parameters which are hoped to be obtained. The ID parameters includes but not limited to IMSI, terminal ID and the like;

Step S304, under the condition that the wireless connection of the UE is maintained, an "ID response" will be returned to respond to the "ID request" message sent by the MME. The "ID response" message will comprise the ID parameters which the MME requests to be verified;

Step S306, the MME sends an "ID inspection request" to the CDIR;

Step S308, the CDIR returns an "ID inspection result" message to the MME;

Step S310, the MME can decide whether to provide corresponding services for the terminal based on the "ID inspection result" message returned by the CDIR.

A method for validating user equipment is also provided according to an embodiment of the present invention.

Figure 4:
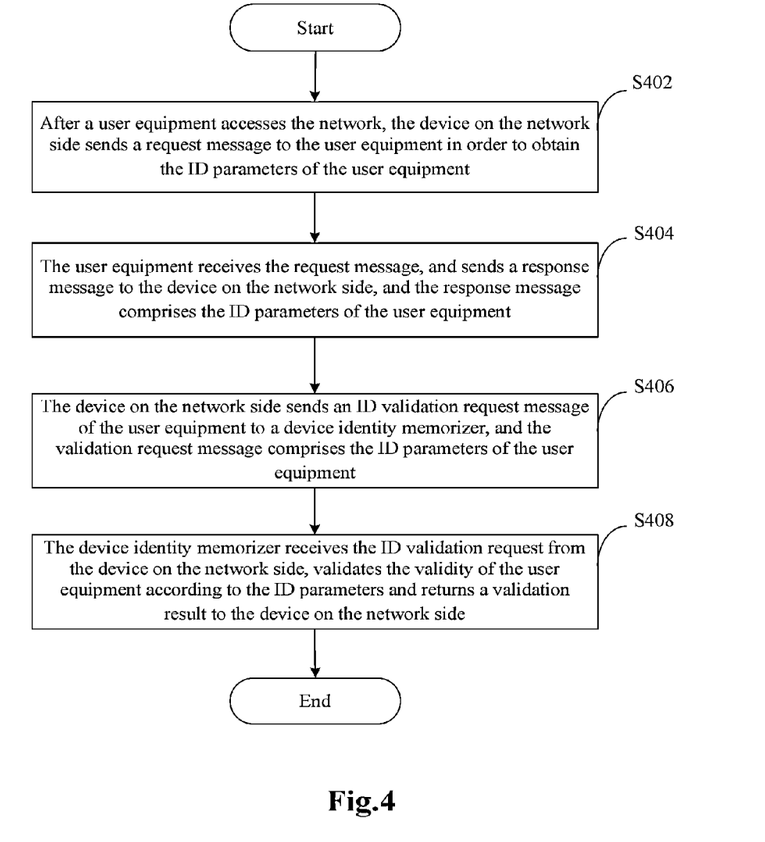
FIG. 4 is a flowchart of a method for validating user equipment according to another embodiment of the present invention.

As shown in FIG. 4, the method for validating user equipment according to the embodiment of the present invention comprises the following procedures:

Step S402, after a UE accesses the network, the device on the network side sends a request message to the UE in order to obtain the ID parameters of the UE;

Step S404, the UE receives the request message and sends a response message to the device on the network side; the response message comprises the ID parameters of the UE;

Step S406, the device on the network side sends a UEID validation request message to a device identity memorizer, and the validation request comprises the ID parameters of the UE;

Step S408, the device identity memorizer receives the ID validation request from the device on the network side, validates the validity of the UE according to the ID parameters, and returns a validation result to the device on the network side.

After the device identity memorizer returns the validation result to the device on the network side in step S408, the method also comprises: step S410, the device on the network side sends a request message to the user equipment which requests to access the network/is accessing the network to obtain the ID parameters of the user equipment; the device on the network side receives an ID response returned by the UE, wherein the ID response comprises the ID parameters of the user equipment.

And, after step S410, the method further comprises: step S406 and step S408 are implemented.

The network is the 3GPP network, and the user equipment comprises the non-3GPP network user equipment which supports the 3GPP access function.

And, the device identity memorizer is used for storing the illegal user equipment identities which comprise illegal non-3GPP network user equipment identities and illegal 3GPP network user equipment identities. Step S408 further comprises: the device identity memorizer determines whether the ID parameters are the same as the illegal user equipment identities stored by the device identity memorizer, if they are the same, a validation result that the UE is legal will be fed back to the device on the network side, which is used for the device on the network side to allow the service request of the user equipment; otherwise, a validation result that the UE is illegal will be fed back to the device on the network side, which is used for the device on the network side to prohibit the service request of the user equipment.

Wherein, the ID parameters of the user equipment comprise at least one of the following parameters or the combination thereof: IMSI, IMEI, MAC address and MEID.

The device on the network side comprises a mobility management entity, and the device identity memorizer is a central device identity register which is used for sharing the illegal user equipment identities in 3GPP network and non-3GPP network.

Wherein, the non-3GPP network at least comprises: 3GPP2, WiMAX and WLAN.

In virtue of the above-mentioned preferable embodiment, the network side initiatively validates the validity of the UE which accesses the 3GPP network, is capable of identifying the illegal non-3GPP network UE which accesses the 3GPP network, and is capable of prohibiting the illegal non-3GPP network UE which is capable of accessing 3GPP network from accessing the 3GPP network.

A method for validating user equipment is also provided according to an embodiment of the present invention.

Figure 5:
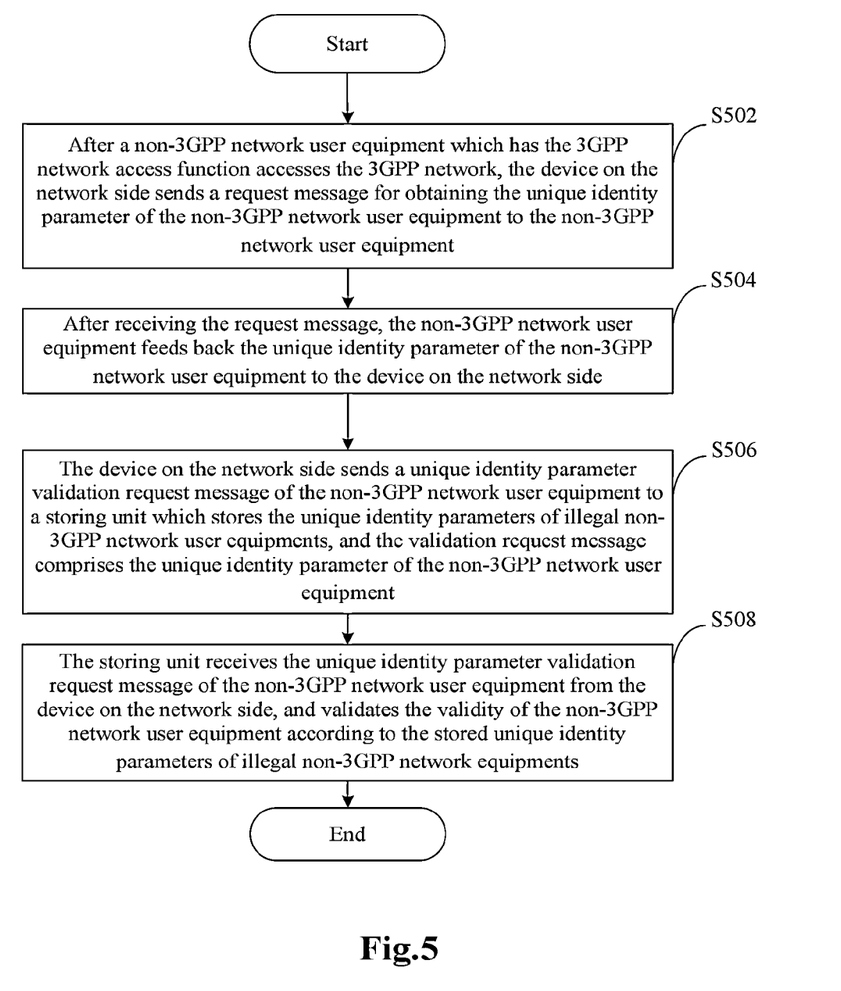
FIG. 5 is a flowchart of a method for validating user equipment according to another embodiment of the present invention.

As shown in FIG. 5, the method for validating user equipment according to the embodiment of the present invention comprises the following procedures:

Step S502, after a non-3GPP network user equipment which has the 3GPP network access function accesses the 3GPP network, the device on the network side sends a request message for obtaining the unique identity parameter of the non-3GPP network user equipment to the non-3GPP network user equipment;

Step S504, after receiving the request message, the non-3GPP network user equipment feeds back the unique identity parameter of the non-3GPP network user equipment to the device on the network side;

Step S506, the device on the network side sends a unique identity parameter validation request message of the non-3GPP network user equipment to a storing unit which stores the unique identity parameters of illegal non-3GPP network user equipments, and the validation request message comprises the unique identity parameter of the non-3GPP network user equipment;

Step S508, the storing unit receives the unique identity parameter validation request message of the non-3GPP network user equipment from the device on the network side, and validates the validity of the non-3GPP network user equipment according to the stored unique identity parameters of the illegal non-3GPP network equipments.

In step S502, the device on the network side sends the request message for obtaining the unique identity parameter of the non-3GPP network user equipment to the non-3GPP network user equipment regularly.

The storing unit may be a storing device which has an independent physical entity; the storing unit certainly may also be a logical storing unit which is arranged in another network side device.

In virtue of the above-mentioned preferable embodiment, the network side initiatively validates the validity of the UE which accesses the 3GPP network, and can prohibit the illegal non-3GPP network UE which is capable of accessing 3GPP network from accessing the 3GPP network.

Device Embodiment

A device identity register is also provided according to an embodiment of the present invention, which is shared by a plurality of networks with different systems, and the plurality of networks with different types comprises: 3GPP, 3GPP2, WiMAX, WLAN and the like.

Figure 6:
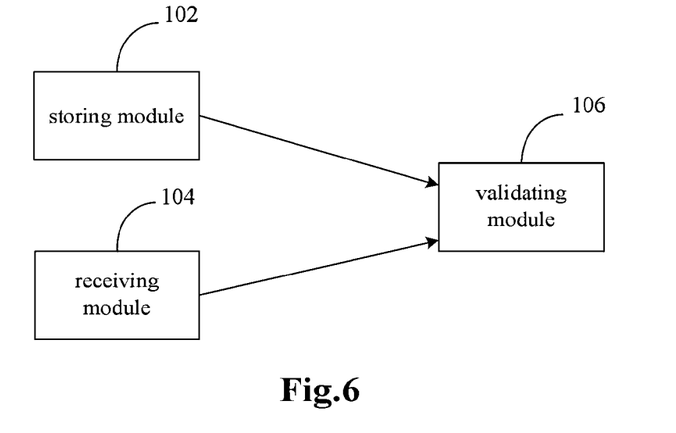
FIG. 6 is a block diagram of a device identity register according to an embodiment of the present invention.

FIG. 6 shows an optimal structure of the device identity register according to the embodiment of the present invention. As shown in FIG. 6, the device identity register comprises: a storing module 102, configured to store illegal UE identities of different networks; a receiving module 104, configured to receive an ID validation request from the network side, wherein the ID validation request carries the ID parameters of a UE; a validating module 106, which is respectively connected to the storing module 102 and the receiving module 104, configured to validate the validity of the UE according to the illegal user equipment identities and the ID parameters, and to return a validation result to the network side, wherein the illegal UE identities stored by the storing module are non-3GPP network UE identities and 3GPP network UE identities.

Wherein, illegal user equipment identities comprise illegal non-3GPP network user equipment identities and/or illegal 3GPP network user equipment identities.

Preferably, the validating module 106 further comprises: an abstracting module (not shown in the figure), configured to abstract the ID parameters carried in the ID validation request; a matching module (not shown in the figure), which is respectively connected to the abstracting module and the storing module 102, configured to match the ID parameters with the illegal user equipment identities; a determining module (not shown in the figure), which is connected to the matching module, configured to determine the validity of the UE corresponding to the ID parameters according to the matching result of the matching module; a feedback module (not shown in the figure), which is connected to the determining module, configured to return the validation result to the network side.

Wherein, if the matching of the matching module is successful, the determining module will determine the UE corresponding to the ID parameters as illegal; if the matching of the matching module is unsuccessful, the determining module will determine the UE corresponding to the ID parameters as legal.

In addition, the ID parameters of the UE comprise IMSI and at least one of the followings: IMEI, MAC address and MEID.

System Embodiment

An access control system is also provided according to an embodiment of the present invention.

Figure 7:
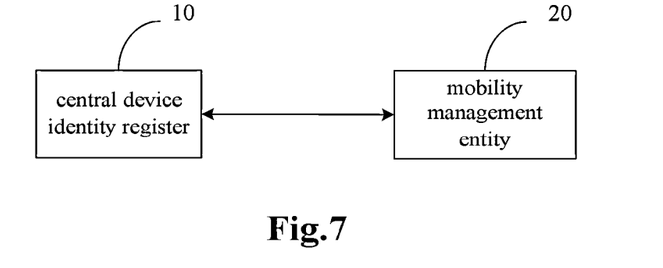
FIG. 7 is a block diagram of an access control system according to an embodiment of the present invention.

FIG. 7 shows an optimal structure of the access control system according to the embodiment of the present invention. As shown in FIG. 7, the access control system comprises: a central device identity register 10, which is shared by different networks, configured to store the illegal user equipment identities of a plurality networks, to receive an ID validation request, wherein the ID validation request carries ID parameters of a user equipment, to validate the validity of the user equipment according to the illegal user equipment identities and the ID parameters, and to return a validation result; a mobility management entity (MME) 20, which is connected to the central device identity register 10, configured to receive the validation result, and to control the access of the UE to the 3GPP network; wherein the plurality networks with different systems comprises: 3GPP, 3GPP2, WiMAX and WLAN.

Wherein, the central device identity register 10 comprises: a storing module (not shown in the figure), configured to store the illegal UE identities, wherein the illegal UE identities comprise illegal non-3GPP network UE identities and/or illegal 3GPP network UE identities; a receiving module (not shown in the figure), configured to receive the ID validation request from the network side, wherein the ID validation request carries the ID parameters of the UE; a validating module (not shown in the figure), which is respectively connected to the storing module and the receiving module, configured to validate the validity of the UE according to the illegal user equipment identities and ID parameters, and to return the validation result to the network side; and the illegal UE identities are non-3GPP network UE identities and 3GPP network UE identities.

Further, the validating module further comprises: an abstracting module (not shown in the figure), configured to abstract the ID parameters carried in the ID validation request; a matching module (not shown in the figure), which is respectively connected to the abstracting module and the storing module, configured to match the ID parameters with the illegal UE identities; a determining module (not shown in the figure), which is connected to the matching module, configured to determine the validity of the UE corresponding to the ID parameters according to the matching result of the matching module; a feedback module (not shown in the figure), which is connected to the determining module, configured to return the validation result to the network side.

And, if the matching of the matching module is successful, the determining module will determine the UE corresponding to the ID parameters as illegal; if the matching of the matching module is unsuccessful, the determining module will determine the UE corresponding to the ID parameters as legal.

The MME 20 concretely comprises: an access control module (not shown in the figure), configured to allow the access of the UE to the 3GPP network if the validation result is legal, and to prohibit the access of the UE to the 3GPP network if the validation result is illegal; an ID receiving-sending module (not shown in the figure), configured to send a request message to the UE which requests for accessing the 3GPP network to obtain the ID parameters of the UE; and to receive an ID response returned by the UE, wherein the ID response comprises the ID parameters of the UE.

In addition, the ID parameters of the UE comprise IMSI and at least one of the followings: IMEI, MAC address and MEID.

In virtue of the above-mentioned technical scheme, the 3GPP network validates the UE of the non-3GPP network type which accesses the 3GPP network, can prevent the access of the illegal non-3GPP network UE which is capable of accessing 3GPP network from accessing the 3GPP network, and maintains the benefits of legal terminal manufactures and legal terminal users.

Obviously, those skilled in the art shall understand that the above-mentioned modules and steps of the present invention can be realized by using general purpose calculating device, can be integrated in one calculating device or distributed on a network which consists of a plurality of calculating devices. Alternatively, the modules and the steps of the present invention can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the present invention is not restricted to any particular hardware and software combination.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A method for validating user equipment, comprising:
   step 1, after a user equipment accesses a network, a device on a network side sending a request message to the user equipment in order to obtain ID parameters of the user equipment;
   step 2, the user equipment receiving the request message, and sending a response message to the device on the network side, wherein the response message comprises the ID parameters of the user equipment;
   step 3, the device on the network side sending an ID validation request message of the user equipment to a device identity memorizer, wherein the validation request message comprises the ID parameters of the user equipment;
   step 4, the device identity memorizer receiving the ID validation request from the device on the network side, validating the validity of the user equipment according to the ID parameters and returning a validation result to the device on the network side;
   wherein the device identity memorizer is a central device identity register, which is configured to share illegal user equipment identities in a 3GPP network and a non-3GPP network.

2. The method according to claim 1, wherein the network is the 3GPP network, and the user equipment comprises a non-3GPP network user equipment which supports a 3GPP access function.

3. The method according to claim 1, wherein the device identity memorizer is configured to store illegal user equipment identities which comprise an illegal non-3GPP network user equipment identities and illegal 3GPP network user equipment identities, step 4 further comprises:
   the device identity memorizer judging whether the ID parameters are the same as the illegal user equipment identities stored in the device identity memorizer, if they are not the same, a validation result that the user equipment is legal will be fed back to the device on the network side, which is used for the device on the network side to allow the service request of the user equipment; otherwise, a validation result that the user equipment is illegal will be fed back to the device on the network side, which is used for the device on the network side to prohibit the service request of the user equipment.

4. The method according to claim 1, wherein the ID parameters of the user equipment comprise at least one of the following parameters or the combination thereof: international mobile subscriber identity, international mobile equipment identity, MAC address and mobile equipment identity.

5. The method according to claim 1, wherein the device on the network side comprises a mobility management entity.

6. The method according to claim 5, wherein the non-3GPP network at least comprises: 3GPP2, WiMAX and WLAN.

7. The method according to claim 1, wherein after the device identity memorizer returning the validation result to the device on the network side in step 4, the method also comprises:
step 5, the device on the network side sending a request message to a user equipment which requests to access the network or is accessing the network to obtain the ID parameters of the user equipment which requests to access the network or is accessing the network; the device on the network side receiving an ID response returned by the user equipment, wherein the ID response comprises the ID parameters of the user equipment which requests to access the network or is accessing the network.

8. The method according to claim 7, wherein after step 5, the method further comprises: implementing step 3 and step 4.

9. The method according to claim 8, wherein the device on the network side is a mobility management entity, in the circumstance that the mobility management entity receives the validation result after executing step 5, the mobility management entity control the access of the user equipment to a 3GPP network according to the validation result.

10. The method according to claim 9, wherein the mobility management entity controlling the access of the user equipment to a 3GPP network according to the validation result comprises:
if the validation result is legal, the mobility management entity allowing the access of the user equipment to the 3GPP network; if the validation result is illegal, the mobility management entity prohibiting the access of the user equipment to the 3GPP network.

11. A method for validating user equipment, comprising:
step 1, after a non-3GPP network user equipment which has a 3GPP network access function accesses a 3GPP network, a device on the network side sending a request message for obtaining a unique identity parameter of the non-3GPP network user equipment to the non-3GPP network user equipment;
step 2, after receiving the request message, the non-3GPP network user equipment feeding back the unique identity parameter of the non-3GPP network user equipment to the device on the network side;
step 3, the device on the network side sending a unique identity parameter validation request message of the non-3GPP network user equipment to a central storing unit which stores unique identity parameters of illegal non-3GPP network user equipments, wherein the validation request message comprises the unique identity parameter of the non-3GPP network user equipment;
step 4, the central storing unit receiving the unique identity parameter validation request message of the non-3GPP network user equipment from the device on the network side, and validating the validity of the non-3GPP network user equipment according to the stored unique identity parameters of the illegal non-3GPP network equipments.

12. The method according to claim 11, wherein in step 1, the device on the network side sends the request message for obtaining the unique identity parameter of the non-3GPP network user equipment to the non-3GPP network user equipment.

13. A system for validating user equipment, comprising:
a device on a network side, configured to send a request message to a user equipment in order to obtain ID parameters of the user equipment after the user equipment accesses a network;
the user equipment, configured to receive the request message, and to send a response message to the device on the network side, wherein the response message comprises the ID parameters of the user equipment;
the device on the network side, further configured to send an ID validation request message of the user equipment to a device identity memorizer, wherein the validation request message comprises the ID parameters of the user equipment;
the device identity memorizer, configured to receive the ID validation request from the device on the network side, to validate the validity of the user equipment according to the ID parameters and to return a validation result to the device on the network side, wherein the device identity memorizer is a central device identity register, which is configured to share illegal user equipment identities in a 3GPP network and a non-3GPP network.

14. The system according to claim 13, wherein the network is the 3GPP network, and the user equipment comprises the non-3GPP network user equipment which supports the 3GPP access function.

15. The system according to claim 13, wherein the device identity memorizer is configured to store illegal user equipment identities which comprise the illegal non-3GPP network user equipment identities and illegal 3GPP network user equipment identities, the device identity memorizer is configured to judge whether the ID parameters are the same as the illegal user equipment identities stored in the device identity memorizer, if they are not the same, a validation result that the user equipment is legal will be fed back to the device on the network side, which is used for the device on the network side to allow the service request of the user equipment; otherwise, a validation result that the user equipment is illegal will be fed back to the device on the network side, which is used for the device on the network side to prohibit the service request of the user equipment.

16. The system according to claim 13, wherein the device on the network side comprises a mobility management entity.

17. The system according to claim 13, wherein the device on the network side is also configured to send a request message to a user equipment which requests to access the network or is accessing the network to obtain the ID parameters of the user equipment which requests to access the network or is accessing the network, and to receive an ID response returned by the user equipment which requests to access the network or is accessing the network, wherein the ID response comprises the ID parameters of the user equipment which requests to access the network or is accessing the network.

18. The system according to claim 17, wherein the device on the network side is also configured to send an ID validation request message of the user equipment which requests to access the network or is accessing the network to a device identity memorizer, wherein the validation request message comprises the ID parameters of the user equipment which requests to access the network or is accessing the network; the device identity memorizer is also configured to receive the ID validation request from the device on the network side, to validate the validity of the user equipment which requests to access the network or is accessing the network according to the ID parameters and to return a validation result to the device on the network side.

19. The system according to claim 18, wherein the device on that network side is a mobility management entity, the device on the network side is also configured to control the access of the user equipment to a 3GPP network according to the validation result.

20. The system according to claim 19, wherein the device on the network side is configured to allow the access of the user equipment to the 3GPP network if the validation result is legal; and to prohibit the access of the user equipment to the 3GPP network if the validation result is illegal.

* * * * *